(12) United States Patent
Liu et al.

(10) Patent No.: US 11,254,596 B2
(45) Date of Patent: Feb. 22, 2022

(54) HIGH-CONCENTRATION SEWAGE TREATMENT SYSTEM AND METHOD FOR SELF-SUFFICIENCY OF ENERGY

(71) Applicant: Wuhan Huizhong Dachuan Automatic Control Equip. Co, Wuhan (CN)

(72) Inventors: Chuan Liu, Wuhan (CN); Xiaochuan Liu, Wuhan (CN)

(73) Assignee: Wuhan Huizhong Dachuan Automatic Control Equip. Co, Wuhan (CN)

( * ) Notice: Subject to any disclaimer, the term of this patent is extended or adjusted under 35 U.S.C. 154(b) by 40 days.

(21) Appl. No.: 16/215,794

(22) Filed: Dec. 11, 2018

(65) Prior Publication Data

US 2019/0135673 A1 May 9, 2019

Related U.S. Application Data

(63) Continuation of application No. PCT/CN2017/092596, filed on Jul. 12, 2017.

(30) Foreign Application Priority Data

Jun. 12, 2016 (CN) .......................... 201610409526.4

(51) Int. Cl.
*C02F 9/00* (2006.01)
*C02F 3/28* (2006.01)
(Continued)

(52) U.S. Cl.
CPC ............... *C02F 9/00* (2013.01); *C02F 3/286* (2013.01); *C02F 1/004* (2013.01); *C02F 3/2873* (2013.01);
(Continued)

(58) Field of Classification Search
CPC .......... C02F 9/00; C02F 3/286; C02F 3/2873; C02F 1/0004; C02F 11/04; C02F 11/06;
(Continued)

(56) References Cited

U.S. PATENT DOCUMENTS

| | | | | |
|---|---|---|---|---|
| 2011/0068058 | A1* | 3/2011 | Sun ........................ | B01D 61/08 210/620 |
| 2014/0238925 | A1* | 8/2014 | Rodriguez-Jovet .......................... | B01D 17/0211 210/305 |
| 2017/0088803 | A1* | 3/2017 | Knoop ..................... | B09B 3/00 |

OTHER PUBLICATIONS

Lucas, anaerobic wastewater treatment, Apr. 4, 2016 (Year: 2016).*
(Continued)

*Primary Examiner* — Bobby Ramdhanie
*Assistant Examiner* — Donovan Bui-Huynh
(74) *Attorney, Agent, or Firm* — Hemisphere Law, PLLC; Zhigang Ma

(57) ABSTRACT

A high-concentration sewage treatment system for self-sufficiency of energy is provided. The system includes a hydrolysis acidification device, an anaerobic reactor, a sludge treatment device, a desulfurization tower, and a biogas power generation device. The hydrolysis acidification device includes a hydrolysis acidification tank, a first sedimentation tank, a first overflow water tank and an overflow pipe. The sludge treatment device includes a second sedimentation tank, a second overflow water tank, an inlet pipe and a dissolved oxygen meter. The second overflow water tank communicates with the hydrolysis acidification tank through a return pipe. The inlet pipe defines a jet hole. A regulating valve is connected to the inlet pipe. The regulating valve controls a speed and a height of mixed liquid in the jet hole. A high-concentration sewage treatment method for self-sufficiency of energy is also provided.

8 Claims, 1 Drawing Sheet

(51) Int. Cl.
*C02F 1/00* (2006.01)
*C02F 11/04* (2006.01)
*C02F 11/06* (2006.01)

(52) U.S. Cl.
CPC ............... *C02F 11/04* (2013.01); *C02F 11/06* (2013.01); *C02F 2001/007* (2013.01); *C02F 2209/005* (2013.01); *C02F 2209/22* (2013.01); *C02F 2209/42* (2013.01); *C02F 2303/10* (2013.01); *Y02E 50/30* (2013.01)

(58) Field of Classification Search
CPC .......... C02F 2001/007; C02F 2209/005; C02F 2209/22; C02F 2209/42; C02F 2303/10; C02F 3/28; C02F 2209/02; C02F 3/1268; C02F 3/308; C02F 1/004; C02F 2103/20; C02F 2103/22; C02F 2103/28; C02F 2103/32; C02F 2103/325; C02F 2209/06; C02F 2209/10; C02F 2301/106; C02F 3/284; C02F 1/34; C02F 1/38; C02F 1/5254; C02F 2201/002; C02F 2209/04; C02F 2209/44; C02F 2301/028; C02F 2303/16; C02F 2303/24; C02F 3/006; C02F 3/2853; C02F 3/30; C02F 3/302; C02F 3/34; C02F 11/121; C02F 2301/08; Y02E 50/30; Y02E 50/343; Y02E 20/326; Y02E 20/363; Y02E 20/30; Y02E 20/32; C12M 21/04; C12M 27/20; C12M 41/18; C12M 45/20; C12M 23/48; C12M 27/06; C12M 27/10; C12M 21/12; C12M 23/58; C12M 25/18; C12M 45/06; C12M 45/07; C12M 23/02; C12M 29/24; C12M 41/26; C12M 47/18; B09B 3/00; Y02W 10/10; Y02W 10/15; Y02W 10/30; Y02W 10/12; Y02W 30/40; Y02W 30/43; Y02W 30/47; B01D 17/0211; B01D 17/0217; B01D 17/041; B01D 17/047; B01D 2256/22; B01D 2257/504; B01D 2313/20; B01D 2313/50; B01D 2315/06; B01D 53/002; B01D 53/229; B01D 61/08; B01D 61/18; B01D 63/06; B01D 63/08; B01D 63/082; B09C 1/10; C12P 1/00; C12P 5/023; C12P 3/00; E03F 11/00; E03F 5/101; E03F 5/22; F23J 15/06; F23J 2215/50; F23J 2900/15061; F25J 2205/20; F25J 2205/40; F25J 2205/80; F25J 2210/04; F25J 2210/70; F25J 2215/04; F25J 2220/82; F25J 2230/08; F25J 2230/30; F25J 2230/80; F25J 2235/80; F25J 2240/80; F25J 2240/90; F25J 2245/02; F25J 2270/02; F25J 2270/06; F25J 3/067; Y02C 10/10; Y02C 10/12; Y02C 20/20; Y02C 20/40; Y10T 137/6991; C05F 17/50; C05F 17/70; C05F 17/957; C05F 5/008; C05G 5/20; C12F 3/02; Y02A 40/20; Y02A 40/212; Y02P 20/145

See application file for complete search history.

(56) References Cited

OTHER PUBLICATIONS

Deublein, Biogas from waste and renewable resources, Feb. 2, 2015 (Year: 2015).*

* cited by examiner

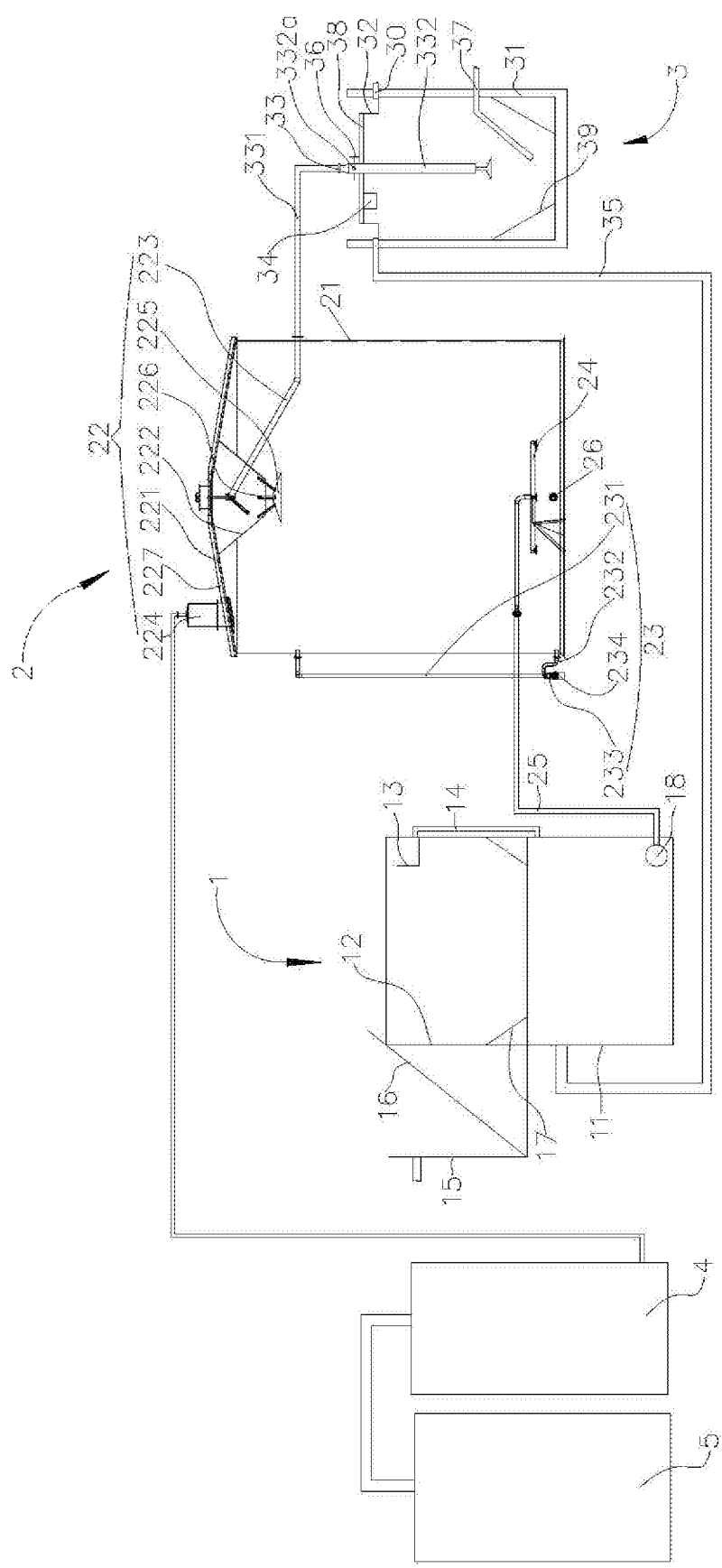

ically, 
HIGH-CONCENTRATION SEWAGE TREATMENT SYSTEM AND METHOD FOR SELF-SUFFICIENCY OF ENERGY

FIELD

The disclosure relates to sewage treatment, in particular to a high-concentration sewage treatment system and method for self-sufficiency of energy.

BACKGROUND

The conventional anaerobic sludge reactor has UASB, EGSB, IC, etc. A principle of wastewater treatment is basically that sewage to be treated is introduced into the reactor as uniformly as possible. The sewage in the reactor and granular or flocculent sludge react and produce biogas (mainly methane and carbon dioxide) to adhere to sludge. As the biogas moves upwards, it hits the three-phase separator to achieve three-phase separation of solid, liquid and gas. Anaerobic sludge reactors are also widely used in wastewater treatment in different fields due to their different specificity.

However, above anaerobic sludge reactor has two disadvantages. On the one hand, the sewage needs to be subjected to hydrolysis acidification treatment before entering the anaerobic sludge reactor, and the hydrolysis acidification treatment tends to cause the sewage to have higher acidity, thereby inhibiting the anaerobic sludge reactor, which is not conducive to improve the treatment efficiency of sewage in the anaerobic sludge reactor and thus leads to a decrease in the overall treatment efficiency. Although the acidity can be reduced by pH adjustment during the hydrolysis acidification process, it is easy to increase cost. On the other hand, the anaerobic sludge reactor sewage treatment energy consumption is large, which is not conducive to save energy.

BRIEF DESCRIPTION OF THE DRAWINGS

Implementations of the present technology will now be described, by way of example only, with reference to the attached figures.

FIG. 1 is a schematic view showing a high-concentration sewage treatment system for self-sufficiency of energy.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Referring to FIG. 1, a high-concentration sewage treatment system for self-sufficiency of energy 100 is presented. The system 100 includes a hydrolysis acidification device 1, an anaerobic reactor 2, a sludge treatment device 3, a desulfurization tower 4, and a biogas power generation device 5. The hydrolysis acidification device 1 includes a hydrolysis acidification tank 11, a first sedimentation tank 12, a first overflow water tank 13, and an overflow pipe 14. The first sedimentation tank 12 covers an opening at an upper end of the hydrolysis acidification tank 11. The first overflow water tank 13 is positioned in the first sedimentation tank 12. The overflow pipe 14 connects to the hydrolysis acidification tank 11 and the first overflow water tank 13. Thus, the hydrolysis acidification tank 11 communicates with the first overflow water tank 13. In an embodiment, an inlet channel 15 is positioned on an side of the first sedimentation tank 12, and a grid 16 is positioned in the inlet channel 15. When sewage is treated, the sewage enters the inlet channel 15 and filtration of large solid impurities in the sewage is processed through the grid 16. The filtered sewage enters the first sedimentation tank 12 and is performed by a precipitation treatment in the first sedimentation tank 12. Then, supernatant in the first sedimentation tank 12 enters the first overflow weir 13, and enters the hydrolysis acidification tank 11 through the overflow pipe 14 for a hydrolysis acidification treatment. The first sedimentation tank 12 is positioned above the hydrolysis acidification tank 11 to facilitate direct flooding of the sewage into the hydrolysis acidification tank 11, thereby avoiding a use of a water pump to increase energy consumption.

An angle between the grid 16 and a horizontal plane is generally set to 60°~75°, which is beneficial for the filtration large solid impurities in the sewage. In an embodiment, the angle between the grid 16 and the horizontal plane is 70°.

In the embodiment, a number of first slanting plates 17 are positioned in the first sedimentation tank 12. The first slanting plates 17 are surrounded to define a first sedimentation area. A cross-sectional area of the first sedimentation area is gradually increased from bottom to top for increasing sedimentation effect. An angle between the first slanting plates 17 and the horizontal plane can be set to 30°~60°. In an embodiment, the angle between the first slanting plates 17 and the horizontal plane is 45°.

In the embodiment, the anaerobic reactor 2 includes a cylinder body 21 connected to the hydrolysis acidification tank 11, a three-phase separator 22 positioned at the top of the cylinder body 21, and an internal circulation device 23 for driving fluid in the cylinder body 21 to flow cyclically.

In an embodiment, an inlet water distributor 24 is positioned in the cylinder body 21. One end of the inlet water distributor 24 is positioned near the bottom of the cylinder body 21, and the other end of the inlet water distributor 24 passes through a sidewall of the cylinder body 21 to connect to the hydrolysis acidification tank 11 through a riser 25. A lift pump 18 is positioned in the hydrolysis acidification tank 11. The lift pump 18 is connected to the riser 25.

Correspondingly, a first drain pipe 26 is positioned at a bottom of the cylinder body 21 for discharging the anaerobic sludge after the anaerobic reaction.

The three-phase separator 22 includes a gas collecting cover 221, a sedimentation chamber 222, a drain pipe 223, an exhaust chamber 224, and a reflecting plate 225. An outer edge of the gas collecting cover 221 is coupled to a top open end of the cylindrical body 21. The upper end of the sedimentation chamber 222 is coaxially connected to a lower surface of the gas collecting cover 221. The lower end of the sedimentation chamber 222 is connected to the reflecting plate 225 through a number of fixing posts 226. A sedimentation space is formed between an inner wall of the sedimentation chamber 222 and the gas collecting cover 221. A gas collecting space is formed between the outer wall of the sedimentation chamber 222 and the gas collecting cover 221. One end of the drain pipe 223 communicates with the sedimentation space, and the other end of the drain pipe 223 extends outside the cylindrical body 221 to connect to the inlet pipe 223. One end of the exhaust chamber 224 is communicate with the gas collection space, and the other end of the exhaust chamber 224 is connected to the desulfurization tower 4.

After the three-phase separator 22 separates the solid, liquid, and gas, the separated biogas enters the exhaust chamber 224, and then enters the desulfurization tower 4 for desulfurization treatment. After the desulfurization treatment, the biogas enters the biogas power generation device 5 to produce electric energy. The electric energy can be provided power to devices in the sewage treatment process, which achieves energy self-sufficiency. Because the biogas contains an amount of water vapor after desulfurization treatment by the desulfurization tower 4, the biogas can be dried after the desulfurization treatment and then is produced for electric energy.

In the embodiment, the gas collecting cover 221 is an umbrella shaped. The gas collecting cover 221 covers the upper end of the entire cylinder body 21 to increase the gas collecting efficiency. The exhaust chamber 224 can be positioned at the top of the gas collecting cover 221. Because the gas collecting cover 221 has a large area, to obtain sufficient strength of the gas collecting cover 221, a number of supporting rods 227 are evenly arranged in radiation on the upper surface of the gas collecting cover 221.

In the embodiment, the sedimentation chamber 222 is cylindrical shaped. An inner diameter of the sedimentation chamber 222 gradually decreases from top to bottom, so that an inner wall of the sedimentation chamber 222 forms a conical settlement surface. In order to increase the solid-liquid separation effect, the angle between the conical settlement surface and the horizontal plane can be set to 30° to 60°. In an embodiment, the angle between the conical settlement surface and the horizontal plane is 45°.

The reflection plate 225 is tapered and positioned coaxially with the sedimentation chamber 222 and the gas collecting cover 221. One end of each fixing post 226 is connected to the sedimentation chamber 222, and the other end of each fixing post 226 is connected to the tapered surface of the reflection plate 225. An solid-liquid mixture inlet is formed between two adjacent fixing posts 226. The solid-liquid mixture inlet communicates with the sedimentation space. Correspondingly, after solid-liquid mixture is precipitated and concentrated in the sedimentation chamber 222, the specific gravity thereof is large, so that it can be flows downward along the conical precipitate of the sedimentation chamber 222 and flows out from the solid-liquid mixture inlet, and then settles to the bottom of the cylinder body 21. The reflecting plate 225 is tapered to avoid accumulation of sludge on the reflecting plate 225, so that the sludge can smoothly flow out of the solid-liquid mixture inlet. In the embodiment, the fixing columns 226 are uniformly arranged along the circumferential direction of the sedimentation chamber 222. One end of each fixing column 226 is connected at the inner wall of the sedimentation chamber 222. Because the fixing column 226 can easily hinder the solid-liquid mixture, in the embodiment, three fixing posts 226 are provided.

The inner circulation device 23 includes an inner circulation inlet pipe 231 positioned near the top end of the cylinder body 21, an inner circulation outlet pipe 232 positioned near the bottom end of the cylinder body 21, an inner circulation water pipe 232 and a controller 234. The inner circulation water pipe 232 is configured to drives water flow from the inner circulation inlet pipe 231 to the inner circulation water pipe 232. The controller 234 is configured to control the inner circulation pipe pump 233 to intermittently drive. The working process of the inner circulation device 23 is as follows: the inner circulation pipeline pump 233 drives the sewage at the upper end of the cylinder body 21 to move from the inner circulation inlet pipe 231 to the inner circulation outlet pipe 232, and the sewage in the inner circulation outlet pipe 232 enters the bottom of the cylinder body 21 to further agitate the sludge settled at the bottom of the cylinder body 21 under an action of the inner circulation pipe pump 233. The sludge at the bottom of the cylinder body 21 is stirred to expand the sludge, and the efficiency of the anaerobic reaction can be improved. A flow rate of the sludge in inner circulation outlet pipe 232 can also be controlled by controlling the inner circulation pipeline pump 233. That is, the flow rate of the water at the bottom of the cylinder body 21 is controlled to control the sludge expansion. After the bottom of the cylinder body 21 is stirred with water for a preset time, the inner circulation pipeline pump 233 stops driving, the anaerobic reaction occurs sufficiently, and the generated bubbles rise and are separated by the three-phase separator 22. After standing for a predetermined time, the circulating pipe pump 233 drives again to expand the sludge again to promote the anaerobic reaction again. Above procedures can ensure the stability of the inner circulation device 23 and the three-phase separator 22.

The sludge treatment device 3 includes a second sedimentation tank 31, a second overflow water tank 32 positioned in the second sedimentation tank 31, an inlet pipe 33 connected the second sedimentation tank 31 and the cylinder body 21, and a dissolved oxygen meter 34. The dissolved oxygen meter 34 is configured to detect dissolved oxygen in the second sedimentation tank 31. The second overflow weir 32 communicates with the hydrolysis acidification tank 11 through a return pipe 35. The inlet pipe 33 defines a jet hole 332a. A regulating valve 36 is connected to the inlet pipe 33. The regulating valve 36 is configured to control a speed and a height of mixed liquid in the jet hole 332a.

The anaerobic reactor 2 can adopt an intermittent reactor. When the intermittent anaerobic reactor 2 is in a water influent state, the sewage containing anaerobic sludge after the anaerobic reaction is in a water effluent state. A mixture of the anaerobic sludge, the sewage and a small amount of methane gas enters the inlet pipe 33, and the solid-liquid mixture containing a large gravity of the sludge flows from the outlet end of the inlet pipe 33 to the bottom of the second sedimentation tank 31, and is discharged through the second discharge pipe 37. Part of the sludge and sewage containing methane gas are ejected out of the jet hole 332a, so that the injected solid liquid falls into the second sedimentation tank 31, and a solid-liquid three-phase reaction interface is formed in the second sedimentation tank 31. The three-phase reaction interface is the liquid level in the second sedimentation tank 31. The regulating valve 36 positioned in the jet hole 332*a* controls the flow rate of the injection and the height of the reaction interface. In the embodiment, the dissolved oxygen meter 34 detects the dissolved oxygen in the second settling tank 31. The regulating valve 36 controlled the dissolved oxygen in the second settling tank 31 to be 0~0.5 mg/L, preferably 0.4~0.5 mg/L. Thereby the reaction interface is enriched with nitrite red bacteria, and the ammonia nitrogen is in the solid-liquid mixture after the injection forms nitrite, and the methane is in the solid-liquid mixture is oxidized. The nitrite-containing upper liquid can be repeatedly used after the reaction. For example, a part of the upper liquid is refluxed to the hydrolysis acidification tank 11 through the reflux pipe 35 for denitrification reaction. Another part of the upper liquid is discharged through the overflow water pipe 30 to the next step.

In order to facilitate the process of the reaction, the inlet pipe 33 includes a jet pipe 332 vertically positioned in the second sedimentation tank 31 and a connecting pipe 331 connecting the jet pipe 332 and the cylinder body 21. The jet hole 332*a* is defined on the jet tube 332. The connecting pipe 33 is connected to the drain pipe 223 passing through the side wall of the cylinder body 21. The nitrite produced by the reaction can enter the hydrolysis acidification tank 11 through the reflux pipe 35, thereby avoiding acidity of the acidified sewage being too high, and improving overall treatment efficiency of the sewage treatment.

Because the injected solid-liquid mixture needs to be in sufficient contact with the air and reacts, the jet hole 332*a* is positioned higher than the liquid level in the second sedimentation tank 31. The jet hole 332*a* is close to a plane of the end surface of the second sedimentation tank 31. In order to prevent the solid-liquid mixture from being sprayed to outside of the second sedimentation tank 31, the jet hole 332*a* is positioned 20 cm to 50 cm below the plane of the end surface of the second sedimentation tank 31 and above the second overflow raft 32.

When the jet hole 332*a* is sprayed, vibration is likely to occur to decrease a injection balance. Therefore, the anaerobic sludge treatment device 3 further includes a cross-shaped fixing bracket 38. Four free ends of the fixing bracket 38 are fixed at the overflow weir 32. The middle of the fixing bracket 38 is connected to the jet tube 332.

A number of second slanting plate 39 are positioned in the second sedimentation tank 31. The first slanting plates 17 are surrounded to define a first sedimentation area. A cross-sectional area of the first sedimentation area is gradually increased from bottom to top to increase sedimentation effect, which is beneficial to increase the sedimentation effect of the sludge.

The working process of the system 100 is as follows: the sewage firstly enters the inlet channel 15 and is initially filtered through the grid 16 to enter the first sedimentation tank 12, and the upper liquid in the first sedimentation tank 12 enters the first overflow weir 13, and enters the hydrolysis acidification tank 11 through the overflow pipe 14 for a hydrolysis acidification treatment. After hydrolysis acidification treatment, the sewage enters the anaerobic reactor 2 for the anaerobic reaction. After the anaerobic reaction, the sewage flows to the bottom of the anaerobic reactor 2 and flows out of the top of the anaerobic reactor 2. Because the sewage contains anaerobic sludge after the anaerobic reaction, the sewage reacted after ejecting out of the jet hole 332. After the reaction, a part of the sewage is processed by a hydrolysis acidification treatment to reduce the acidity of the sewage, and another part of sewage can be treated by other processes. The biogas formed by the anaerobic reaction enters the desulfurization tower 4 for desulfurization treatment and dried after the desulfurization treatment, and then enters the biogas power generation device 5 to produce electric energy for providing power for the device in the sewage treatment process.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A sewage treatment system comprising:
   a hydrolysis acidification device comprising:
      a hydrolysis acidification tank;
      a first sedimentation tank covering an opening at an upper end of the hydrolysis acidification tank;
      a first overflow water tank positioned in the first sedimentation tank; and
      an overflow pipe connected to the hydrolysis acidification tank and the first overflow water tank, wherein sewage enters the first sedimentation tank and is performed by a precipitation treatment in the first sedimentation tank, supernatant in the first sedimentation tank enters the hydrolysis acidification tank through the overflow pipe for a hydrolysis acidification treatment;
   an anaerobic reactor comprising:
      a cylinder body connected to the hydrolysis acidification tank;
      a three-phase separator positioned at the top of the cylinder body; and
      an internal circulation device configured to drive fluid in the cylinder body to flow cyclically, wherein after the hydrolysis acidification treatment, the sewage enters the cylinder body for an anaerobic reaction, the three-phase separator separates solid, liquid, and gas in the sewage after the anaerobic reaction;
   a sludge treatment device comprising:
      a second sedimentation tank;
      a second overflow water tank positioned in the second sedimentation tank;
      an inlet pipe connected the second sedimentation tank and the cylinder body; and
      a dissolved oxygen meter configured to detect dissolved oxygen in the second sedimentation tank;
   a desulfurization tower connected to the three-phase separator; and
   a biogas power generation device connected to the desulfurization tower and configured to provide power to the sewage treatment system, wherein separated gas enters the desulfurization tower for a desulfurization treatment, after the desulfurization treatment, the gas enters the biogas power generation device to produce electric energy;
   wherein the second overflow water tank communicates with the hydrolysis acidification tank through a return pipe, the inlet pipe defines a jet hole, a regulating valve is connected to the inlet pipe, the regulating valve is configured to control a speed and a height of mixed liquid in the jet hole, wherein the inlet pipe comprises a jet pipe vertically positioned in the second sedimentation tank and a connecting pipe connecting the jet pipe and the cylinder body, the jet hole is defined on the jet tube; wherein after the anaerobic reaction, the sewage contains anaerobic sludge, a mixture of the anaerobic sludge, the sewage, and an amount of methane gas enters the inlet pipe, the solid-liquid mixture containing the anaerobic sludge flows from the outlet end of the inlet pipe to a bottom of the second sedimentation tank and is discharged, part of the anaerobic sludge and sewage containing the methane gas are ejected out of the jet hole, injected solid-liquid mixture falls into the second sedimentation tank, and a solid-liquid three-phase reaction interface is formed in the second sedimentation tank, the solid-liquid three-phase reaction interface is enriched with nitrite red bacteria, and ammonia nitrogen is in the solid-liquid mixture after the injection forms nitrite, and methane in the solid-liquid mixture is oxidized.

2. The system of claim 1, wherein the three-phase separator comprises a gas collecting cover, a sedimentation chamber, a drain pipe, an exhaust chamber, and a reflecting plate, an outer edge of the gas collecting cover is coupled to a top open end of the cylindrical body, the upper end of the sedimentation chamber is coaxially connected to a lower surface of the gas collecting cover, the lower end of the sedimentation chamber is connected to the reflecting plate through a number of fixing posts, a sedimentation space is formed between an inner wall of the sedimentation chamber and the gas collecting cover, a gas collecting space is formed between the outer wall of the sedimentation chamber and the gas collecting cover, one end of the drain pipe communicates with the sedimentation space, and the other end of the drain pipe extends outside the cylindrical body to connect to the inlet pipe, one end of the exhaust chamber is communicate with the gas collection space, and the other end of the exhaust chamber is connected to the desulfurization tower.

3. The system of claim 1, wherein the internal circulation device comprises an inner circulation inlet pipe positioned near the top end of the cylinder body, an inner circulation outlet pipe positioned near the bottom end of the cylinder body, an inner circulation water pipe and a controller, the inner circulation water pipe is configured to drive water flow from the inner circulation inlet pipe to the inner circulation water pipe, the controller is configured to control an inner circulation pipe pump to intermittently drive.

4. The system of claim 1, wherein an inlet water distributor is positioned in the cylinder body, one end of the inlet water distributor is positioned near the bottom of the cylinder body, and the other end of the inlet water distributor passes through a sidewall of the cylinder body to connect to the hydrolysis acidification tank through a riser.

5. The system of claim 1, wherein the jet hole is positioned 20 cm to 50 cm below the plane of the end surface of the second sedimentation tank.

6. The system of claim 1, wherein a plurality of first slanting plates and a plurality of second slanting plates are positioned in the first sedimentation tank and the second sedimentation tank, the first slanting plates are surrounded to define a first sedimentation area, the second slanting plates are surrounded to define a second sedimentation area, cross-sectional areas of the first sedimentation area and the second sedimentation area are gradually increased from bottom to top.

7. The system of claim 2, wherein the gas collecting cover is an umbrella shaped, the sedimentation chamber is cylindrical, the reflection plate is tapered and positioned coaxially with the sedimentation chamber and the gas collection cover.

8. The system of claim 1, wherein an inlet channel is positioned on a side of the first sedimentation tank, and a grid is positioned in the inlet channel, an angle between the grid and a horizontal plane is generally set to 60°~75°.

\* \* \* \* \*